United States Patent
Wang et al.

(10) Patent No.: US 6,759,770 B1
(45) Date of Patent: Jul. 6, 2004

(54) COOLING SYSTEM FOR MODULAR FIELD WINDINGS OF A GENERATOR

(75) Inventors: Yu Wang, Clifton Park, NY (US); Christopher Anthony Kaminski, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 3 days.

(21) Appl. No.: 10/411,214

(22) Filed: Apr. 11, 2003

(51) Int. Cl.[7] .................................................. H02K 9/00
(52) U.S. Cl. .......................... 310/52; 310/54; 310/55; 310/56; 310/261
(58) Field of Search .................... 310/52, 59, 60 R, 310/60 A, 61, 261

(56) References Cited

U.S. PATENT DOCUMENTS

| | | | | |
|---|---|---|---|---|
| 4,227,102 A | * | 10/1980 | Rozenfeld et al. | 310/52 |
| 4,267,474 A | * | 5/1981 | Kullmann | 310/52 |
| 4,280,071 A | * | 7/1981 | Eckels | 310/52 |
| 4,543,503 A | | 9/1985 | Kaminski et al. | |
| 4,546,279 A | * | 10/1985 | Hammer et al. | 310/59 |
| 4,667,125 A | | 5/1987 | Kaminski et al. | |
| 4,709,177 A | | 11/1987 | Kaminski | |
| 4,751,412 A | * | 6/1988 | Lowther et al. | 310/52 |
| 4,814,655 A | | 3/1989 | Kaminski | |
| 5,065,064 A | | 11/1991 | Kaminski | |
| 5,084,641 A | * | 1/1992 | Saima et al. | 310/51 |
| 5,252,880 A | | 10/1993 | Kazmierczak et al. | |
| 5,281,877 A | | 1/1994 | Kazmierczak et al. | |
| 5,644,179 A | | 7/1997 | Staub et al. | |
| 5,774,032 A | * | 6/1998 | Herd et al. | 335/216 |
| 5,929,550 A | | 7/1999 | Kaminski et al. | |
| 6,194,807 B1 | | 2/2001 | Kaminski et al. | |
| 6,204,580 B1 | * | 3/2001 | Kazmierczak | 310/52 |
| 6,339,268 B1 | | 1/2002 | Kaminski et al. | |
| 6,392,326 B1 | | 5/2002 | Turnbuli et al. | |
| 6,437,476 B1 | | 8/2002 | Nygard et al. | |
| 6,465,917 B2 | * | 10/2002 | Wetzel et al. | |
| 6,495,942 B1 | | 12/2002 | Kaminski et al. | |

* cited by examiner

Primary Examiner—Thanh Lam
(74) Attorney, Agent, or Firm—Nixon & Vanderhye

(57) ABSTRACT

Modular field windings including multiple coils are provided about a rotor core. Axially spaced spacers maintain the coils circumferentially spaced from one another, the spacers and coils defining radially directed openings in the rotor. Flow directing elements are disposed in the openings to maintain constant or increased flow velocity of cooling gas in a radial outward direction along passages between the elements and the coils to maintain or increase the heat transfer coefficient, thereby enhancing the cooling effect of the gas flow on the turns.

20 Claims, 3 Drawing Sheets

COOLING SYSTEM FOR MODULAR FIELD WINDINGS OF A GENERATOR

BACKGROUND OF THE INVENTION

The present invention relates to generators having modular field windings for mounting on a rotor core and particularly relates to cooling flow directing elements for disposition between circumferentially adjacent windings to optimize radial outward cooling flow for the field windings.

Conventional generators have rotors that support field windings. These rotors typically have rotor cores with circumferentially spaced axially extending slots that receive each turn of the field windings. These rotor slots usually have wedges secured in the radial outer ends of the slots to restrain the windings against centrifugal forces that arise as the rotor spins. During assembly, the windings are installed turn by turn in the slots of the rotor core. Conventional generator field winding turns are cooled by flowing a cooling medium such as air or hydrogen through axial grooves or radial holes punched in the copper turns. Since the cooling gas path is machined, optimized cooling gas paths can be achieved to provide maximum heat transfer.

BRIEF DESCRIPTION OF THE INVENTION

Modular field winding systems have been developed including a generator rotor having a multi-pole magnetic core and a plurality of modular winding assemblies, one for each pole. The winding assemblies are fitted over the parallel-sided forging of the multi-pole magnetic core and an enclosure is slidable over the assembly. The winding assemblies also include a series of axially spaced winding spacers or baffles that hold each of the winding turns in fixed relation to one another. The openings between the axially adjacent spacers and the circumferentially adjacent turns define natural open spaces for flowing a cooling gas, e.g., air or hydrogen, radially outwardly between the spacers and turns. Because of this arrangement, it will be appreciated that the heat transfer surface area is increased. However, the cooling gas velocity and, hence, the heat transfer coefficient is more a function of the geometry of the cooling path rather than the increased surface area. More particularly, the cooling gas path flows radially from inside the coil where the space between adjacent coils is the narrowest and flows radially outwardly to exit at the outer radius where the space between adjacent coils is the widest. The flow velocity is therefore reduced in a radial outward direction, and the convective heat transfer coefficient of the copper turns is reduced. Hotter downstream cooling gas combined with the reduced heat transfer coefficient results in higher local conductor temperatures along the outer radius of the windings.

In accordance with a preferred embodiment of the present invention, flow directing elements are inserted into the openings between the spacers and windings to provide a constant or increased flow velocity when cooling gas flows through the field windings in a radial outward direction. By maintaining or increasing the flow velocity along the radial path, the peak temperature of the windings is reduced and increased flow velocity will reduce average winding temperature. The cross-sectional area may thus remain constant, resulting in a constant flow velocity, as compared to a decreasing flow velocity in the absence of the flow directing elements and, hence, a higher comparative heat transfer coefficient. By shaping the elements such that the flow area decreases in a radial outward direction, the flow velocity and, hence, the heat transfer coefficient will increase. Consequently, the highest heat transfer coefficients may be obtained near the outer radius of the turns where the temperatures are the highest. Also, different areas between the coils can be equipped with different sized elements to provide high heat transfer coefficients in hot areas by increasing the flow velocity. By using different sized elements, flow distribution can be more uniform, resulting in a more uniform field winding temperature.

Heat transfer coefficients may be increased even further by using heat transfer augmentation surfaces or flow directing element supporting members. For example, the surfaces of the flow elements may be conditioned, such as by providing a roughness, dimples, grooves or vortex generators to effectively increase heat transfer coefficients.

In a preferred embodiment according to the present invention, there is provided a cooling system for a generator comprising a generator rotor including a multi-pole magnetic core, a plurality of modular field windings about the rotor, one for each pole, each modular field winding including a plurality of coils circumferentially spaced from one another with circumferentially adjacent coils defining generally wedge-shaped openings therebetween and flow directing elements disposed in the openings and defining with the coils passages for flowing a cooling gas from radially within the coils in a generally radial outward direction to exit locations adjacent an outer periphery of the rotor to cool the coils.

In a further preferred embodiment according to the present invention, there is provided a cooling system for a generator comprising a generator rotor, a plurality of modular field windings about the rotor, each modular field winding including a plurality of coils circumferentially spaced from one another with circumferentially adjacent coils defining openings therebetween and means disposed in the openings and between the coils for directing a cooling gas flow along the coils from radially within the coils in a generally radial outward direction to exit locations adjacent an outer periphery of the rotor to cool the coils, the cooling gas directing means being configured to provide with the circumferentially adjacent coils cooling flow passages affording a constant or increasing flow velocity to the cooling gas in a radially outward direction.

DETAILED DESCRIPTION OF THE INVENTION

Figure 1:
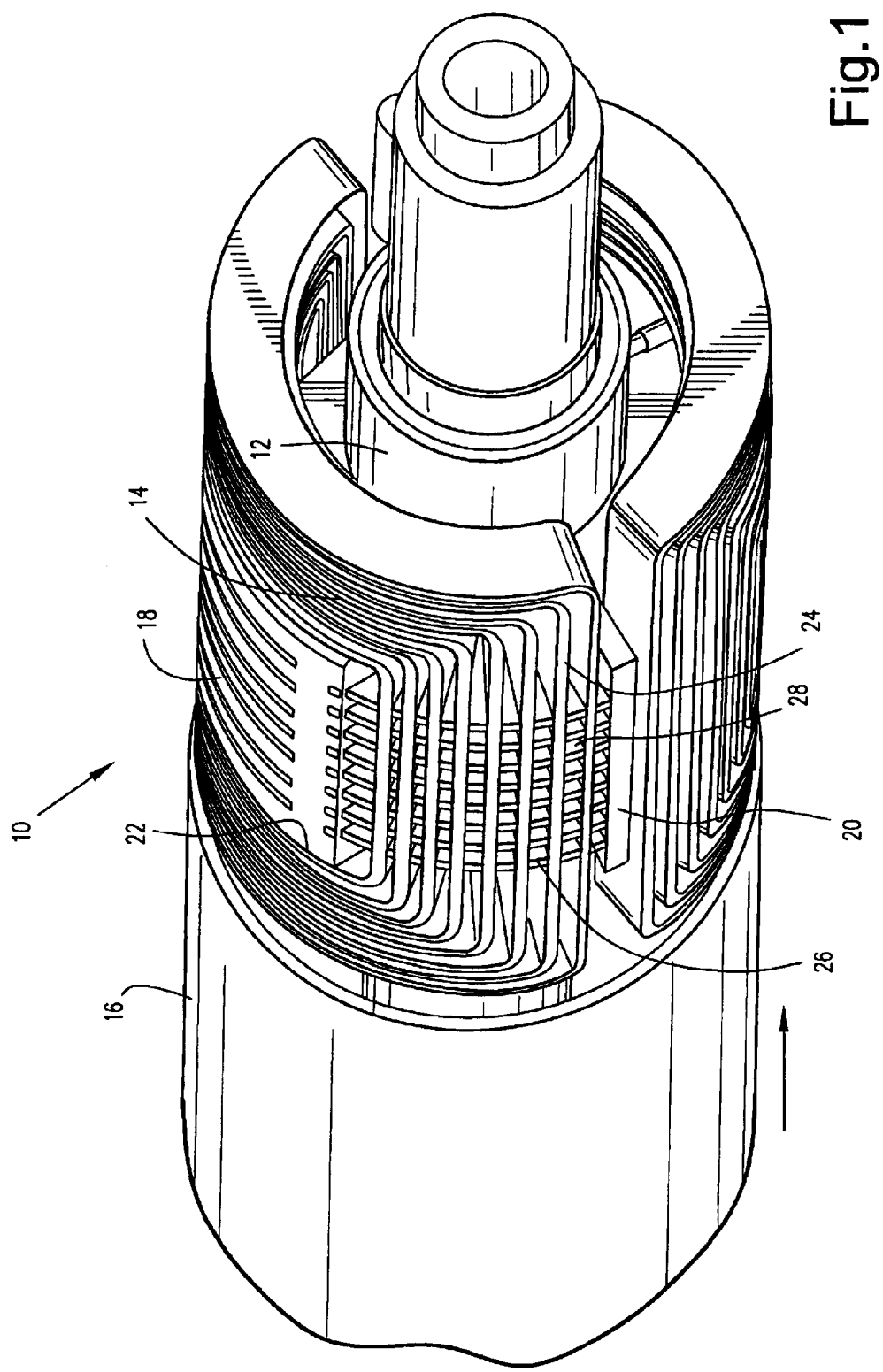
FIG. 1 is a fragmentary perspective view of an exemplary generator having a rotor, modular winding turns and a cylindrical enclosure set back from the modular windings to illustrate the latter.

Referring now to FIG. 1, there is illustrated in a perspective view an exemplary generator, generally designated 10, having a rotor 12 and modular field windings or turns 14 mounted on the rotor 12 for rotation therewith. As illustrated, a generally cylindrical enclosure 16 is also illustrated forming part of the rotor and which enclosure 16 is shown spaced axially back for clarity from its normal location overlying the rotor and the modular field windings 14. The stator for the generator is not illustrated. A complete description of the generator 10 having the modular field windings about the rotor is set forth in U.S. patent application Ser. No. 09/977,211, filed Oct. 16, 2001, in the name of Yu Wang et al. and titled "Apparatus and Method for a Field Winding Assembly Mountable in a Synchronous Machine," the disclosure of which is incorporated by reference. Suffice to say, that the rotor 12 includes a plurality of magnetic poles 18 forming a multi-pole magnetic core and a plurality of modular field windings 14, one winding for each pole. The rotor 12 also includes a pair of fins 20 projecting radially outwardly from the rotor core.

In the illustrated rotor, the modular field windings 14 each includes a central opening 22 which receives a pole 18. The windings 14 are spaced axially and circumferentially relative to one another. For example, and as illustrated, axially extending coils 24, forming part of the windings 14, are spaced circumferentially one from the other by a series of axially spaced spacers or baffles 26. The baffles 26 are secured to the fins 20 by locking bars, not shown, locking the modular windings 14 to the poles 18. It will be appreciated from a review of FIG. 1 that the axially extending coils 24 are circumferentially spaced one from the other and the spacers 26 are axially spaced one from the other. As a consequence, the coils 24 and spacers 26 form a plurality of generally wedge-shaped openings or apertures 28 projecting in a generally radial direction from adjacent the rotor core to the external radial outward surface of the rotor. It will be appreciated that cooling gas, e.g., air or hydrogen, may be passed from radially within the rotor in a direction radially outwardly through the openings 28 to cool the windings 14. It will also be appreciated that with this arrangement, the openings 28 have a cross-sectional area which increases in a radial outward direction. Thus, cooling gas flowing radially from within the rotor outwardly through the openings 28 would generally decrease in velocity with reduced heat transfer coefficient.

Figure 3:
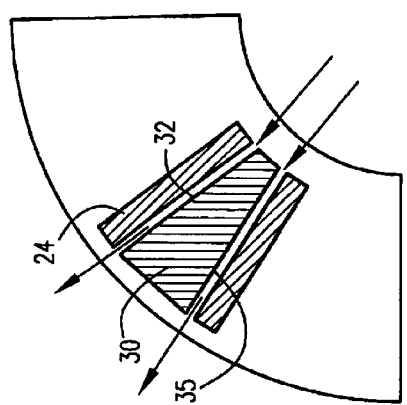
FIG. 3 is a schematic representation of a flow directing element between the circumferentially adjacent winding turns forming cooling gas passages of constant cross-sectional area.

To provide enhanced heat transfer coefficient, means are provided for directing a cooling gas flow along the turns from radially within the coils in a generally radially outward direction to exit locations adjacent an outer periphery of the rotor to cool the coils. The flow directing means, for example, may include flow directing elements 30 disposed in each of the openings 28. The flow directing elements may be formed of a non-electrically conductive material, e.g., a thermoplastic material, or may be metallic with suitable electrical insulation provided along these surfaces. As illustrated in exaggerated form in FIG. 3, the flow directing elements 30 may take the form of truncated sectors having sides 32 in circumferential registration with the coils 24 and sides 33 in axial registration with the spacers 26. As illustrated in FIG. 3, the elements 30 and the circumferentially adjacent coils 24 form flow passages 35 between the circumferentially registering surfaces 32 and the coils 24 which are substantially constant in cross-sectional area in a radial direction. The flow velocity between elements 30 and turns 24 therefore remains constant and the heat transfer coefficient also remains constant throughout the radial extent of the turns.

Figure 4:
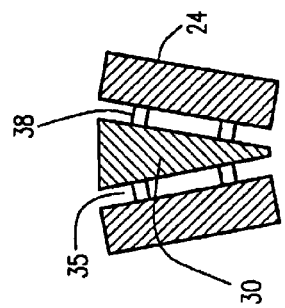
FIG. 4 is a view similar to FIG. 3 illustrating standoffs for the flow directing elements.
Figure 5:
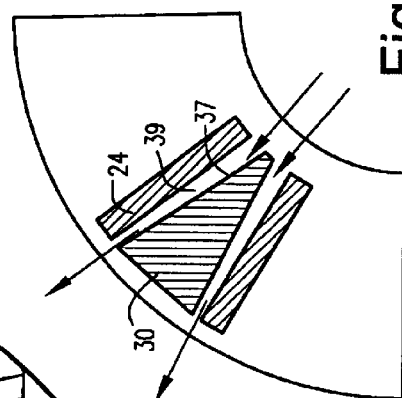
FIG. 5 is a view similar to FIG. 3 illustrating converging cooling gas passages in a radially outward direction.
Figure 2:
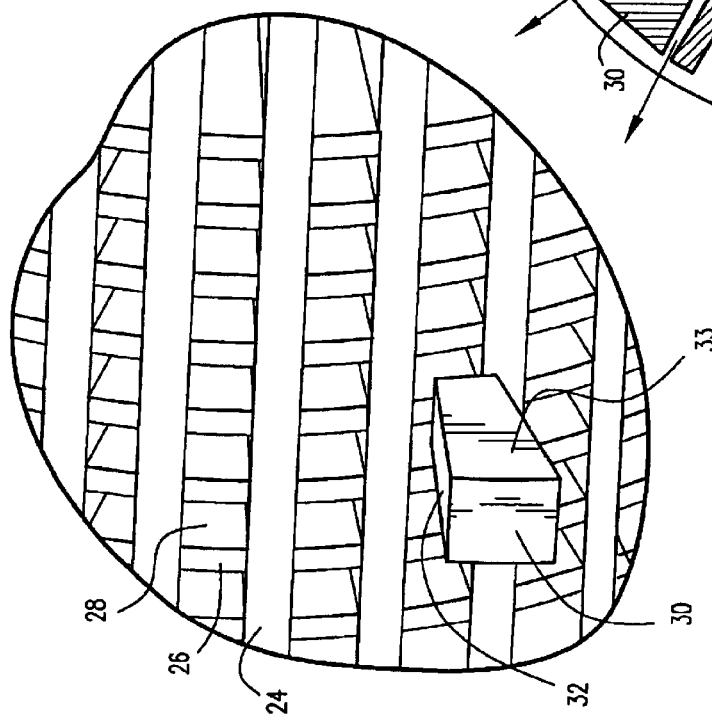
FIG. 2 is an enlarged fragmentary perspective view illustrating the openings between axially adjacent spacers and circumferentially adjacent winding turns.

In FIG. 4, the flow elements 30 are spaced from the circumferentially adjacent coils 24 by dimples 38, thus spacing elements 30 from coils 24 and defining flow passages 35 having substantially constant flow areas. It will also be appreciated that the surfaces of the flow elements in registration with the circumferentially adjacent windings may converge with the registering surfaces of the turns. For example, as illustrated in FIG. 5, the flow directing elements 30 have angled surfaces 37 which incline toward the adjacent circumferentially registering turns in radial outward directions. In this geometry, the cross-sectional area of the flow passage 39 therebetween decreases in a radial outward direction. This increases the flow velocity which therefore also increases the heat transfer coefficient for greater cooling effect. Thus, the hotter downstream, i.e., radially outwardly directed gas, may still have the same or even greater heat transfer coefficient as compared with the heat transfer coefficient at radially innermost portions of the flow passage.

Figure 7:
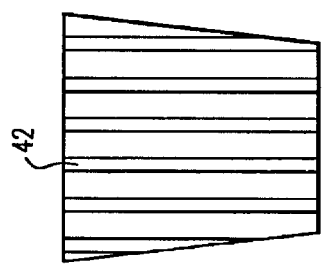
FIGS. 6–9 are various surface configurations for the flow directing elements for disposition between the spacers and turns.
Figure 9:
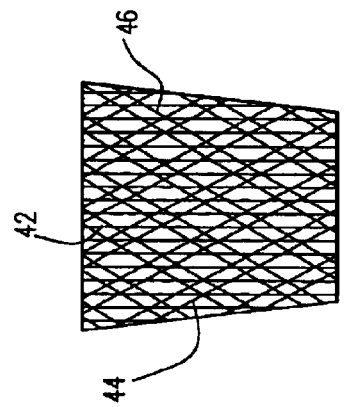
Figure 6:
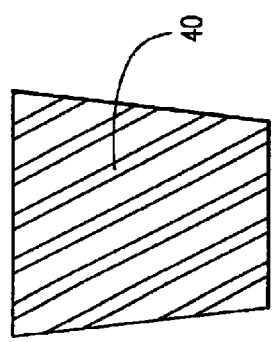
Figure 8:
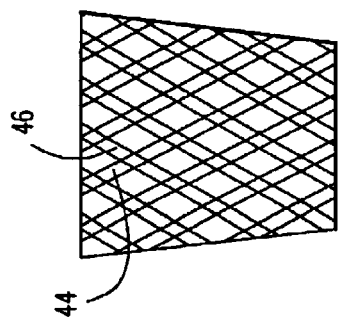

Illustrated in FIGS. 6–9 are a series of surface configurations formed in the registering surfaces 32 or 37 of the flow elements 30 in opposition to the turns 24. In FIG. 6, a plurality of generally angled grooves 40 are formed in the surfaces 32 or 37. In FIG. 7, the grooves 42 may be directed radially rather than angled as in FIG. 5. In FIG. 8, a series of crossing grooves 44 and 46 are illustrated in the surfaces 32 or 37 of the cooling elements 30. FIG. 9 illustrates a combination of the grooves 42, 44 and 46 of FIGS. 7 and 8 in the side surface 32 or 37 of element 30. It will be appreciated that the surface areas of the grooves can be tailored to provide high heat transfer coefficients in hot areas by increasing the flow velocity in comparison with the flow velocity in other areas between the flow directing elements 30 and turns 24. Also, and referring back to FIG. 4, the standoffs 38 may comprise dimples or vortex generators or a surface roughness, all of which provide the increased heat transfer coefficient.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A cooling system for a generator comprising:

a generator rotor including a multi-pole magnetic core;

a plurality of modular field windings about the rotor, one for each pole, each modular field winding including a plurality of coils circumferentially spaced from one another with circumferentially adjacent coils defining generally wedge-shaped openings therebetween; and flow directing elements disposed in said openings and defining with the coils passages for flowing a cooling gas from radially within the coils in a generally radial outward direction to exit locations adjacent an outer periphery of the rotor to cool the coils.

2. A system according to claim 1 wherein said elements are generally wedge-shaped and have dimensionally smaller ends radially inwardly of dimensionally larger ends adjacent radially outer portions of the openings.

3. A system according to claim 1 wherein said passages include grooves in surfaces of said elements in registration with circumferentially adjacent coils.

4. A system according to claim 3 wherein circumferentially opposite surfaces of said elements engage the adjacent coils on opposite sides of said openings and said grooves lie along opposite sides of said elements for flowing cooling gas to cool the adjacent coils.

5. A system according to claim 4 wherein said elements are generally wedge-shaped and have dimensionally smaller ends radially inwardly of dimensionally larger ends adjacent radially outer portions of the openings.

6. A system according to claim 1 including a plurality of baffles at axially spaced locations along each modular field winding segregating the openings into axially spaced apertures, said elements being disposed in said apertures.

7. A system according to claim 6 wherein said elements are generally wedge-shaped and have dimensionally smaller ends radially inwardly of dimensionally larger ends adjacent radially outer portions of the openings.

8. A system according to claim 7 wherein said elements have at least one face in registration with an adjacent coil and spaced from said adjacent coil.

9. A system according to claim 1 wherein the passages have substantially constant cross-sectional areas from locations radially within the rotor to said exit locations adjacent an outer surface of the rotor for maintaining a substantially constant flow velocity.

10. A system according to claim 9 wherein said elements are generally wedge-shaped and have dimensionally smaller ends radially inwardly of dimensionally larger ends adjacent radially outer portions of the openings.

11. A system according to claim 1 wherein the passages have a substantially decreasing cross-sectional area in a radially outward direction to increase flow velocity.

12. A system according to claim 11 wherein said elements are generally wedge-shaped and have dimensionally smaller ends radially inwardly of dimensionally larger ends adjacent radially outer portions of the openings.

13. A cooling system for a generator comprising:

a generator rotor;

a plurality of modular field windings about the rotor, each modular field winding including a plurality of coils circumferentially spaced from one another with circumferentially adjacent coils defining openings therebetween; and means disposed in said openings and between the coils for directing a cooling gas flow along the coils from radially within the coils in a generally radial outward direction to exit locations adjacent an outer periphery of the rotor to cool the coils, said cooling gas directing means being configured to provide with said circumferentially adjacent coils cooling flow passages affording a constant or increasing flow velocity to the cooling gas in a radially outward direction.

14. A system according to claim 13 wherein said circumferentially spaced coils define wedge-shaped openings therebetween, said directing means includes generally wedge-shaped elements having dimensionally smaller ends radially inwardly of dimensionally larger ends adjacent radially outer portions of the openings.

15. A system according to claim 14 wherein said passages include grooves in surfaces of said elements in registration with circumferentially adjacent coils.

16. A system according to claim 15 wherein circumferentially opposite surfaces of said elements engage the adjacent coils on opposite sides of said openings and said grooves lie along opposite sides of said elements for flowing cooling gas to cool the adjacent coils.

17. A system according to claim 13 including a plurality of baffles at axially spaced locations along each modular field winding segregating the openings into axially spaced apertures, said directing means being disposed in said apertures.

18. A system according to claim 13 wherein said circumferentially spaced coils define wedge-shaped openings therebetween, said directing means includes generally wedge-shaped elements having dimensionally smaller ends radially inwardly of dimensionally larger ends adjacent radially outer portions of the openings, said elements having at least one face in registration with an adjacent coil and spaced from said adjacent coil.

19. A system according to claim 13 wherein the passages have substantially constant cross-sectional areas from locations radially within the rotor to said exit locations adjacent an outer surface of the rotor for maintaining a substantially constant flow velocity.

20. A system according to claim 13 wherein the passages have a substantially decreasing cross-sectional area in a radially outward direction to increase flow velocity.

* * * * *